United States Patent [19]

Henderson et al.

[11] Patent Number: 5,444,704

[45] Date of Patent: Aug. 22, 1995

[54] DIAL RESTORAL METHOD AND APPARATUS

[75] Inventors: P. Michael Henderson, Largo; Edward A. Thoenes, St. Petersburg, both of Fla.

[73] Assignee: AT&T Corp., Murray Hill, N.J.

[21] Appl. No.: 743,661

[22] Filed: Aug. 12, 1991

[51] Int. Cl.⁶ .............................................. H04J 3/22
[52] U.S. Cl. .................................. 370/84; 375/222; 370/16
[58] Field of Search .................. 370/84, 85.8, 55, 112, 370/16, 85.6; 375/7, 8, 112, 122; 379/95; 341/60, 61, 116, 117; 371/8.1, 8.2, 11.1, 11.2; 340/825.01, 827

[56] References Cited

U.S. PATENT DOCUMENTS

| | | | |
|---|---|---|---|
| 3,676,846 | 7/1972 | Busch | 371/33 |
| 4,432,087 | 2/1984 | Hubbard | 370/55 |
| 4,759,017 | 7/1988 | Allan et al. | 370/84 |
| 4,924,456 | 5/1990 | Maxwell et al. | 375/8 |
| 4,952,930 | 8/1990 | Franaszek et al. | 340/827 |
| 5,155,728 | 10/1992 | Takeuchi et al. | 370/112 |
| 5,276,887 | 1/1994 | Haynie | 370/85.6 |
| 5,301,274 | 4/1994 | Li | 375/8 |

Primary Examiner—Douglas W. Olms
Assistant Examiner—Shick Hom
Attorney, Agent, or Firm—Joseph J. Opalach

[57] ABSTRACT

In a multidrop data communication system operating at a first bit rate using the High-Level Data Link Control (HDLC) protocol, dial restoral of communications with a particular tributary at a second, lower bit rate is accomplished without requiring the system as a whole to back down to that lower bit rate. Specifically, the outgoing data is buffered in the dial restoral modem, which discards the data stored in the buffer upon receipt of the HDLC frame which follows any frame in which the so-called "poll" bit is set.

29 Claims, 6 Drawing Sheets

DIAL RESTORAL METHOD AND APPARATUS

TECHNICAL FIELD

The present invention relates to dial restoral of leased data communication lines.

BACKGROUND OF THE INVENTION

Single call dial restoral, or backup, of leased multi-drop data communications lines is traditionally carried out by using a two-wire "dial restoral" modem at the central, or control, site and one at the remote, or tributary, site for each tributary site which is "restored." The dial restoral modems at the control site must be digitally bridged to the leased line device, which is either a modem (for analog transmission) or a data service unit (DSU) for digital transmission.

Due to this digital bridging, the entire network, comprised of the leased line and all of the dial lines, must operate at the same speed, i.e., data bit rate. This causes significant system problems for the designer or user of the system. Since the dial restoral modems are limited in the speed at which they can operate (today that speed is about 14.4 kbps), any leased line which operates at a rate higher than that must be slowed down to the speed of the dial line.

For modems, this can be done by changing the speed of the control leased line modem. For DSUs, however, the situation is more difficult since the speed of the line is fixed by the service provider and cannot be changed by the user. Two solutions have traditionally been suggested for this situation. The first is to provide a multiplexer in both the control and remote DSUs which can be switched in and operated at the lower speed when going to dial restoral mode. Thus, even though the digital leased line operates at a speed higher than the dial modem, the speed of the data terminal equipment (DTE) served by the network is reduced to the speed of the dial restoral modem. The second method suggested is to initiate a dial restoral for every tributary connection, or "drop," whenever any one drop must be restored.

All of these solutions (for both analog and digital leased lines) can significantly reduce the performance of the overall line (for example, a 56 kbps line backed up at 0.6 kbps). The solutions known for the digital environment are also expensive as a result of their substantial equipment requirements.

Another problem arises when several drops must be restored. In this case, a subsequent restoral attempt may not be able to restore at the same speed that a previous restoral was accomplished due to impairments in the access line to that drop. There are two alternatives in this case. The first is to ignore this drop and not back it up. The second is to somehow communicate to all other devices on the "network" the necessity of falling back to the lower speed. Even if this can be accomplished, the performance of the network will be limited to the worse case connection speed.

SUMMARY OF THE INVENTION

A data transmission system embodying the principles of the present invention overcomes the limitations of the prior art via a method in which data received by the dial restoral modem at the original data rate is entered into a buffer in that modem and re-transmitted out of the buffer at the lower rate. In order to prevent the incoming, control site data from "over running" the modem, i.e., overflowing the buffer, the modem periodically clears the buffer in such a way as to discard some of the data flowing from the control site, specifically data that was not intended for the tributary site that is being backed up.

One possible way of implementing such a technique would be to provide the dial restoral modem with the ability to adaptively "learn" the network address of the tributary DTE to which it is connected and, by monitoring the addresses in the incoming data stream, to discard the data not addressed to that particular tributary. Such an approach, however, would be complex to implement and the ability to carry it out successfully in a wide variety of situations is open to question.

In accordance with a feature of the invention, however, knowledge about the protocol used by the control site and tributary DTEs can be used to determine which buffer contents can be discarded without losing information intended for the tributary site being backed up. This feature is particularly applicable to systems using a protocol which requires the control site DTE, having completed a transmission to a particular tributary DTE, to wait for a response therefrom before initiating any further transmissions to that or any other tributary DTE (unless a predetermined timeout period elapses). In accordance with this feature of the invention, the receipt by the dial restoral modem of such further communications serves as an indication, as will be appreciated from the detailed description hereinbelow, that any data still in the buffer can be discarded.

In particular embodiments of the invention, the discarding of data in the buffer can be carried out in response to control information (as contrasted with address information.)specified by the protocol. In this context, the invention can be used to particular advantage in systems in which communications between the control site DTE and the tributary DTEs are carried out using the HDLC or a similar "bit-synchronous" protocol. In such protocols, the control information includes a so-called "poll" bit within the transmitted frame. The poll bit is caused to be set by the control site DTE in the last frame of a message transmitted to a particular tributary DTE, such a frame being referred to herein as a "poll frame." The receipt of a poll frame indicates to the tributary that it is to respond to the control site DTE. In preferred embodiments of the invention, the value of the poll bit is observed by the dial restoral modem and its value is used to control the aforementioned selective discarding of data. Specifically, once a poll frame is received, the dial restoral modem waits until the next frame is received and then discards all data still waiting in the buffer.

DETAILED DESCRIPTION

Figure 1:
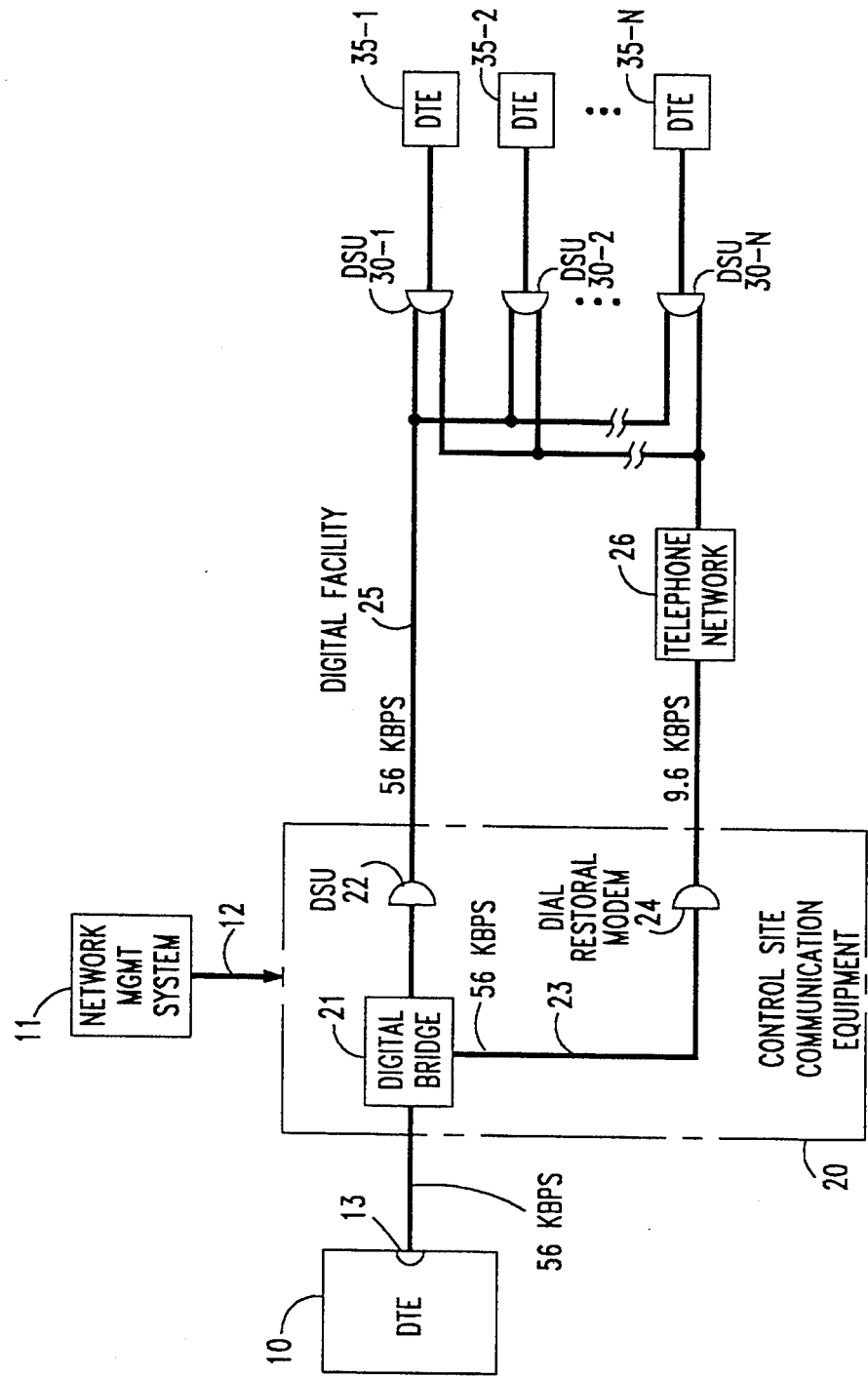
FIG. 1 is a block diagram of a multidrop data communication system having dial restoral capabilities embodying the principles of the invention.

In the data communication system of FIG. 1, control site data terminal equipment (DTE) 10—illustratively a host computer—communicates with N tributary site DTE units, or DTEs 35-1 through 35-N. The latter are illustratively data entry terminals. At the control site, the system includes control site data communications equipment 20, which includes a plurality of data service units (DSUs) connected to respective ports of DTE 10. Only one such connection is explicitly shown, that being the connection of port 13 of DTE 10 to DSU 22 via digital bridge 21. The function of the latter is described hereinbelow. For present purposes, it suffices to note that data is supplied from port 13 through bridge 21 to DSU 22 from which it is communicated onto multidrop communications facility, or network, 25—illustratively a leased, digital telephone facility. Other DSUs (not shown) within equipment 20 are typically connected to other respective multidrop facilities.

The data communications equipment connected to the "drops" of multidrop facility 25 include tributary DSUs 30-1 through 30-N. Each of the latter, in turn, serves a respective one of tributary DTEs 35-1 through 35-N.

Communications in the system of FIG. 1, as thus far described, are illustratively at a data rate of 56 kilobits/sec (kbps) and are duplex. That is, DTE 10 transmits to DTEs 35-1 through 35-N via bridge 21, DSU 22, facility 25 and DSUs 30-1 through 30-N, while DTEs 35-1 through 35-N transmit to DTE 10 via the opposite route. The DTEs use a standard protocol, illustratively the HDLC protocol to communicate with one another. (The term "HDLC" as used herein is intended to include the very similar protocol known as "SDLC.") In standard fashion, the protocol regulates access to facility 25, provides error control, etc.

Figure 8:
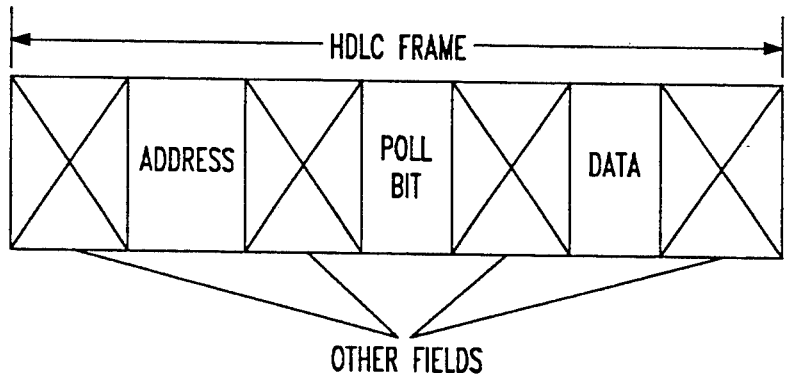
FIG. 8 depicts the format of HDLC frames used in the system of FIG. 1.

The 56 kbps HDLC data stream is communicated in "frames," each of which includes address and control information—the latter regulating, for example, the flow of frames among the control and tributary DTEs—as well as data representing the actual intelligence to be communicated. The format of an HDLC frame is shown in FIG. 8. Although each tributary DTE receives all the data frames transmitted by DTE 10, it ignores all frames, i.e., does not act upon their data content, except those which bear the particular DTE's address. In the reverse direction of transmission, the important issue is not addressing (since a tributary DTE can only direct communications to one place—DTE 10) but rather the preclusion of data "collisions" that would occur if two or more tributary DTEs concurrently attempted to transmit over facility 25. This situation is avoided by the HDLC protocol, however, which a) allows a tributary DTE to transmit only when "polled" by DTE 10 and b) requires DTE 10, having polled a first tributary DTE, to refrain from polling a second one until it receives a response from the first one (or the aforementioned timeout period elapses).

The system of FIG. 1 also includes network management system 11 which, illustratively, is co-located with equipment 20 and communicates therewith over line 12. Network management system 11 provides such functions as provisioning the options of the various components of equipment 20, causing various tests to be performed on the equipment and the communications facility, and generating various system usage, error and other reports. Another of its functions is to monitor the "health" of the system and to initiate corrective action in the event that problems are detected. In particular, the discovery that an acceptable level of communications reliability cannot be maintained with a particular tributary DTE will cause network management system 11 to initiate a so-called "dial restoral," wherein an alternative communications connection, or channel, is established. To this end, equipment 20 includes a pool of "dial restoral" modems capable of establishing dial-up telephone connections with any of the various tributary DSUs such as DSUs 30-1 through 30-N, the latter, then acting as modems, being configured to receive such calls and to communicate with the dial restoral modems that called them.

Only one of the dial restoral modems—modem 24—is explicitly shown in FIG. 1. This modem illustratively conforms to CCITT Recommendation V.32 which sets forth specifications for communications at a data rate of 9.6 kbps over dial-up telephone lines.

In operation, when network management system 11 detects the loss of an acceptable level of communications reliability between control DSU 22 and, for example, tributary DSU 30-N, it causes dial restoral modem 24 to initiate a telephone connection with DSU 30-N via the public switched telephone network (PSTN) 26. It also controls digital bridge 21 to a) split the 56 kbps stream from DTE port 13 so that it is applied not only to DSU 22, but also to dial restoral modem 24, on line 23 and b) provides a "logical OR" function whereby data received by modem 24 from DSU 30-N—now operating as a V.32 modem—are routed back to port 13 (along with data received by DSU 22 from facility 25).

If at a later time network management system 11 determines that the integrity of communications with DSU 30-N has been restored, it causes dial restoral modem 24 to terminate the dial-up connection with DSU 30-N and communications between DSUs 22 and 30-N are resumed over facility 25.

With the exception of dial restoral modem 24, all of the components shown in FIG. 1 are standard, and commercially available from any of a number of vendors. The various modes of operation described, including the dial restoral operation, are also standard—at the level of description provided thus far. The present invention departs from the prior art, however, in that, unlike the prior art arrangements, the invention allows the data stream generated by DTE 10 to continue at its original 56 kbps rate, rather than forcing it to drop down to the rate at which dial restoral modem 24 operates—9.6 kbps, in this example.

Figure 2:
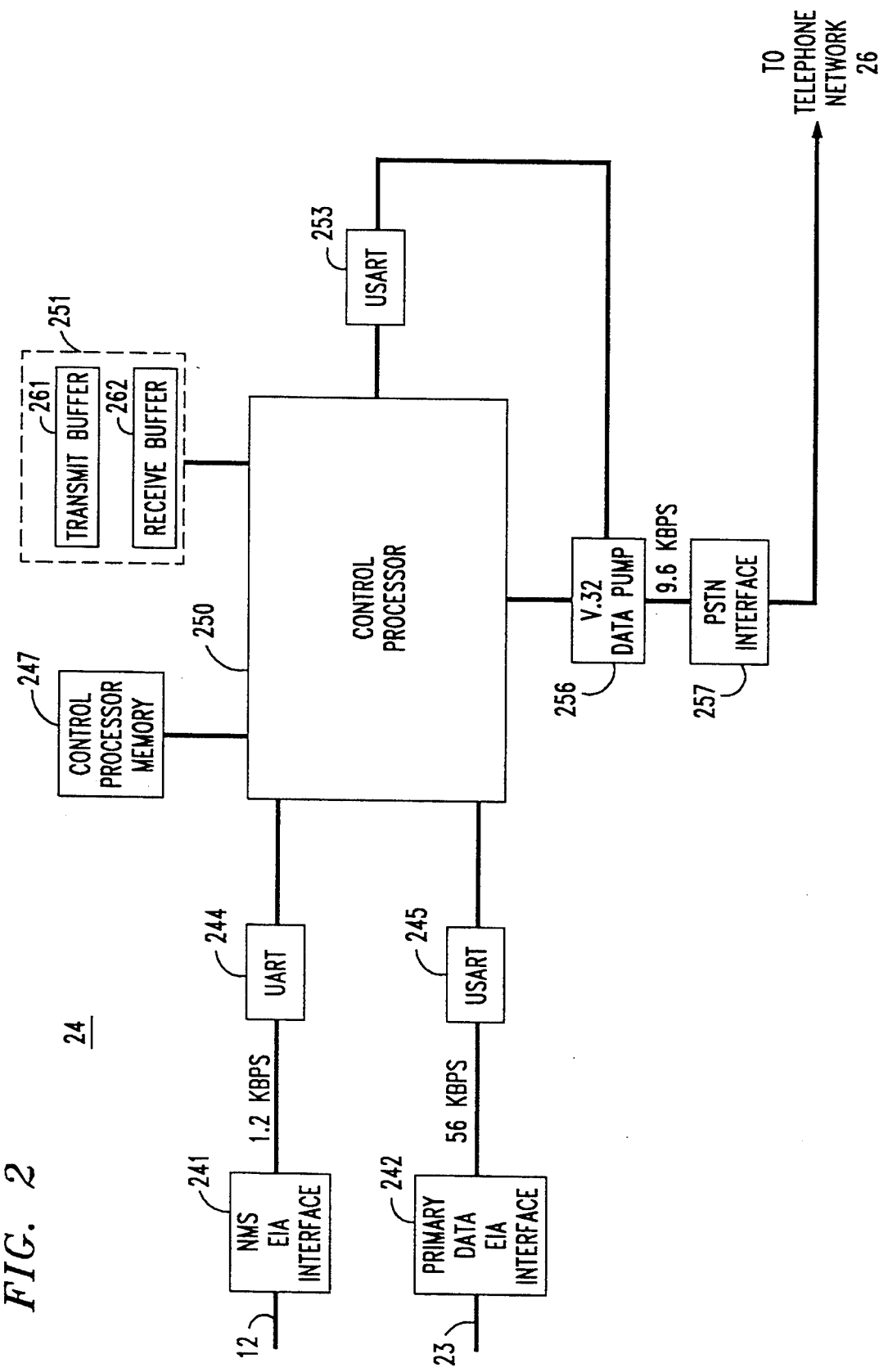
FIG. 2 is a block diagram of a dial restoral modem used in the system of FIG. 1.

This advantageous result is achieved by a unique arrangement provided within restoral modem 24. Accordingly, attention is directed to FIG. 2, which is a functional block diagram of modem 24.

At the heart of modem 24 is a control processor 250, which includes a microprocessor and standard microprocessor peripherals. Of the latter, control processor memory 247 is shown explicitly. Communications on the "DTE side" of the modem at 56 kbps on line 23 are by way of primary data EIA interface 242—which illustratively conforms to RS422—and universal synchronous/asynchronous receiver/transmitter (USART) 245. Communications with network management system 11 at 1.2 kbps on line 12 are by way of NMS EIA interface 241 and universal asynchronous receiver/transmitter (UART) 244.

Since data is received by the modem from DTE 10 at 56 kbps but is transmitted over telephone network 26 at 0.6 kbps, that data needs to be buffered. To this end, the 56 kbps data received from USART 245 is stored by control processor 250 in a transmit buffer 261 within a buffer memory 251. It is read out of the buffer at 0.6 kbps and supplied via USART 253 to V.32 data pump 256. The latter provides V.32-type encoding and modulation functions to supply an outgoing 0.6 kbps line signal to telephone network 26 via PSTN interface 257. The capacity of buffer 261 is sufficient to ensure that, when operated in accordance with the invention as described below, transmit buffer 261 does not overflow, i.e., run out of storage space.

Conversely, 9.6 kbps data received from the line signal incoming from telephone network 26 via interface 257 is taken by control processor 250 from data pump 256 and stored in receive buffer 262 of buffer memory 251. From there, it is read out and supplied by control processor 250 at 56 kbps to USART 245 and thence to interface 242.

As noted earlier, modem 24 embodies the principles of the present invention in that it allows the network of FIG. 1 to continue to operate at 56 kbps, even though the communications between modem 24 and DSU 30-N are at 9.6 kbps. In actuality, most of modem 24 is of standard design and does not need to be described in further detail. The portion of modem 24 which embodies the invention principally comprises buffer memory 251 and software that executes within control processor 250. Accordingly, the remainder of the discussion hereof focuses on that aspect of modem 24.

Figure 3:
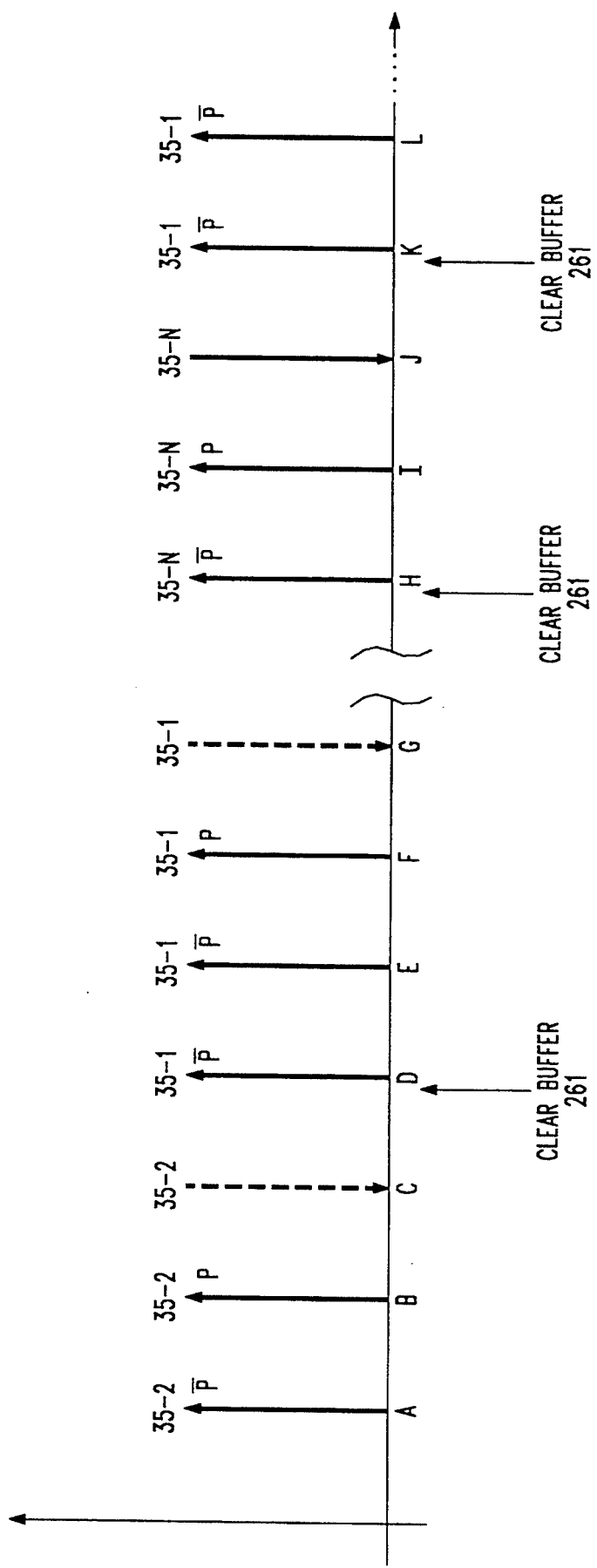
FIGS. 3 and 4 are time sequence charts helpful in explaining the principles of the invention.

FIG. 3, in particular, is a chart helpful in explaining the operation of modem 24 in carrying out the invention. The HDLC protocol transmits data in so-called "frames," each of which includes address, control and data fields. The address field provides an address identifying the tributary DTE for which the frame is intended. The control fields include a so-called "poll" bit, described below. Again, reference may be made to FIG. 8 which shows the format of an HDLC frame, with various fields not relevant to the present discussion simply being marked as "other fields."

Each of the "up" arrows in FIG, 3 represents an "outgoing" HDLC frame generated by DTE 10 at 56 kbps. Specifically, the up arrows labeled 35-2 represent outgoing frames whose address field indicates that they are intended for DTE 35-2 and so forth for the other up arrows. Typically, the tributary DTEs of a system like that of FIG. 1 are addressed in fixed, round-robin order. This is not necessary for the present invention, however. To emphasize this point, FIG. 3 depicts a random order.

The notation P (P̄) next to an arrow indicates that the HDLC "poll" bit within the frame in question is in its set (not set) state. It is only when a tributary DTE receives a frame with a set poll bit that it is allowed—indeed, required—to respond to DTE 10, in accordance with the HDLC protocol rules. The "down" arrows in FIG. 3 represent such responses by the various tributary DTEs, as labeled. FIG. 3 is presented from the viewpoint of modem 24. The latter does not "see" the responses generated by DTEs 35-1, 35-2, . . . 35-(N-1) because these responses appear only on multidrop facility 25. To denote this, the "down" arrows representing the responses of these DTEs are shown with dashed lines. However, since the response from DTE 35-N is, in fact, "seen" by modem 24, its arrow is shown in solid line. The various frames are labeled A through L for reference.

In preferred embodiments of the invention, the ability of modem 24 to communicate with DSU 35-N at 9.6 kbps without causing transmit buffer 261 to overflow is achieved by having control processor 250 monitor the 56 kbps stream received from DTE 10 and to periodically clear buffer 251 as a function of its observation of the state of the aforementioned poll bits. (Programmed into the DTE frame receive task discussed below is enough knowledge about HDLC to be able to locate, and read the value of, the poll bit within each HDLC frame.)

In particular, whenever control processor 250 observes the arrival of a frame with a set poll bit—referred to herein as a "poll frame"—it waits until the next frame arrives and then clears buffer 251. (The various points in time at which the buffer is cleared are indicated in FIG. 3.) Thus, as long as the buffer is large enough to accommodate the maximum number of frames that the HDLC protocol allows to occur between poll frame appearances, the buffer will not overflow. As will now be explained, this approach preserves all data intended for DTE 35-N, and therefore achieves the goal of allowing DTE 10 to continue to generate a 56 kbps stream while modem 24 communicates at 9.6 kbps.

Figure 4:
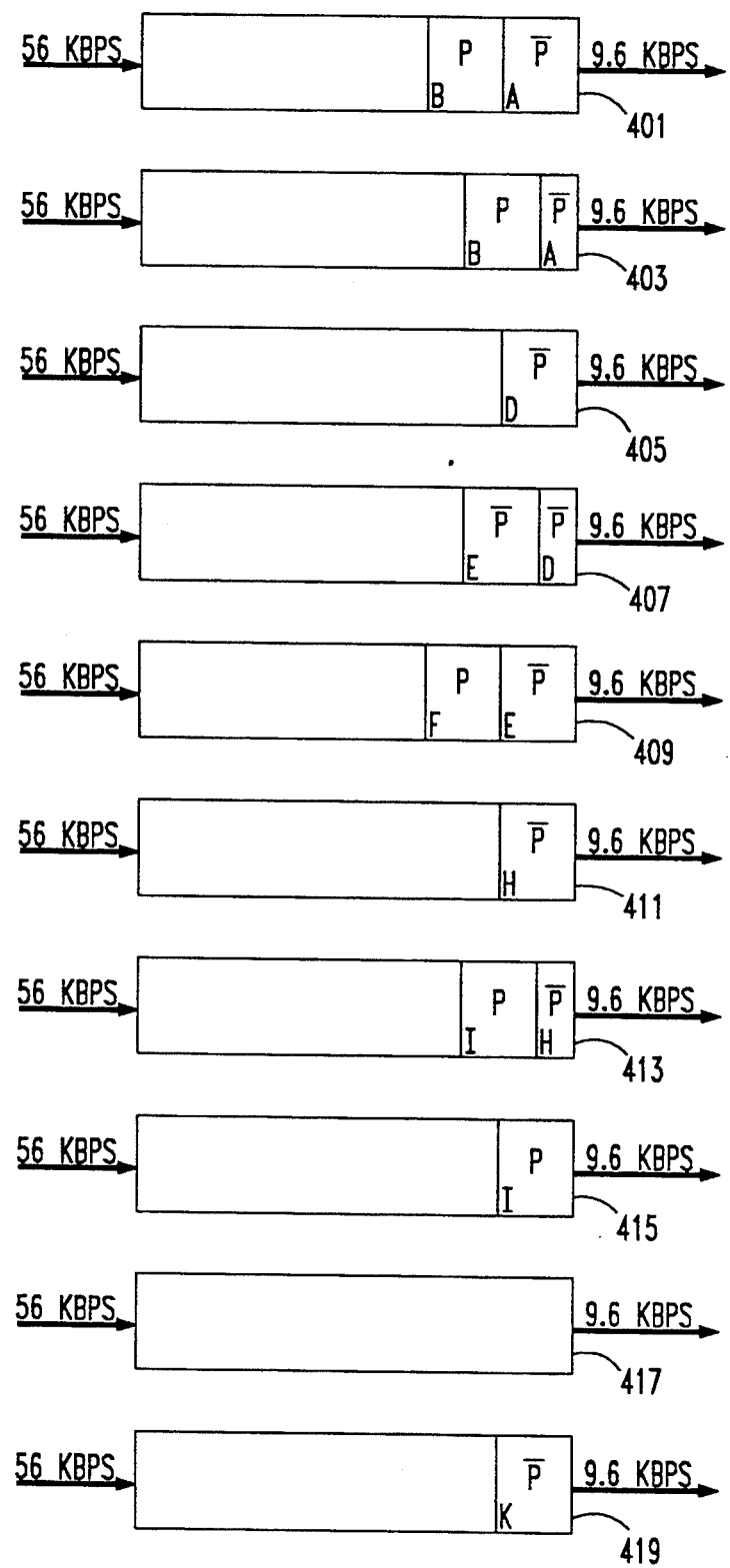

Specifically, reference is now made to FIG. 4, which shows the contents of transmit buffer 261 in response to the occurrence of outgoing frames A, B, D, E, F, H, I, K and L of FIG. 3. FIG. 4 shows the contents of transmit buffer 261 at a sequence of points in time. In particular, the contents of buffer 261 at the point in time immediately following the storage of frame B therein is indicated at 401. The buffer thus includes most of frame A—some of it already having been output from the buffer at 9.6 kbps—and all of frame B. At 402, more of frame A has been read out of the buffer. Since frame B is a poll frame, the arrival of the next frame—frame D—causes the buffer to be cleared. This loss of the data is of no consequence; as will be seen, the technique being described ensures that that lost data was not addressed to DTE 35-N, which is the only data that matters vis-a-vis modem 24. It is thus seen at 405 that the buffer has, in fact, been cleared of the data from frames A and B and currently holds only data from frame D. As subsequent frames arrive, they are stored in the buffer while, at the same time, data is being read out. Thus, 407 represents the point in time that frame D has been partially output and frame E has just arrived. At 400, frame D has been fully output and frames E and F are resident in the buffer.

Since frame F is a poll frame, the arrival of frame H causes the buffer to again be cleared so that, as shown at 411, only frame H is left in the buffer. Frame H is intended for DTE 35-N. Thus it is necessary that neither it nor any subsequent frames intended for DTE 35-N be cleared from the buffer. This is ensured by the fact that DTE 10, after having transmitted a poll frame addressed to DTE 35-N—in this example, frame I—will not transmit any further frames to any tributary DTE until DTE 35-N has responded. The latter, however, will not in fact respond until it has fully received frame I. The buffer is thus allowed to proceed to fully empty, as seen at 413, 415 and 417. It is only when frame K arrives that the buffer will be cleared—responsive to the fact that the poll bit of the previous frame, frame I, was set. By that time, however, all data destined for DTE 35-N (frame I having been the last) has been read out and therefore no harm is done by the buffer clearing. (As an alternative implementational detail, control processor 250 can check to see if the buffer is empty and, if it is, to simply bypass the clearing step. This, in fact, is the approach taken by transmit task 504 described below.)

As a part of the engineering design of a system such as that being described, it should be noted that, in accordance with the HDLC protocol, DTE 10, after beginning to transmit a poll frame to a tributary DTE such as DTE 35-N, will expect a response within a predetermined timeout period. If it does not receive one, a transmission error will be deemed to have occurred and a re-transmission or other error recovery mechanism will be invoked. Since data is sent to DTE 35-N by modem 24 at 0.6 kbps rather than 56 kbps, DTE 35-N will take longer to respond than the tributary DTEs that are still communicating over facility 25. The system should thus be programmed in such a way that the aforementioned timeout period is long enough to account for this, thereby precluding the initiation of unneeded re-transmissions. It can also be noted that, under certain circumstances, a frame addressed to DTE 35-N might actually get lost—although not irretrievably. Consider, for example, the transmission of adjacent non-poll frames addressed to DTEs 35-1 and 35-N, followed by two poll frames addressed to those same DTEs. (Such a sequence, although not usual, is allowed by HDLC.) In this case, the first frame addressed to DTE 35-N will get cleared along with the two frames addressed to DTE 35-N when the second frame for DTE 35-N arrives. The HDLC protocol, however, is robust enough to recover from the loss of a frame via, for example, a re-transmission—no matter what the reason for the loss—so that this scenario, although causing a slight reduction in throughput, does not cause any irretrievable data loss.

It may also be noted that since receive buffer 262 (FIG. 2) receives data at a slower rate than data is read from it, its operation is completely straightforward. Control processor 250 can simply wait until enough data from DTE 35-N has accumulated in the receive buffer to warrant sending it on to DTE 10 at 56 kbps.

Figure 5:
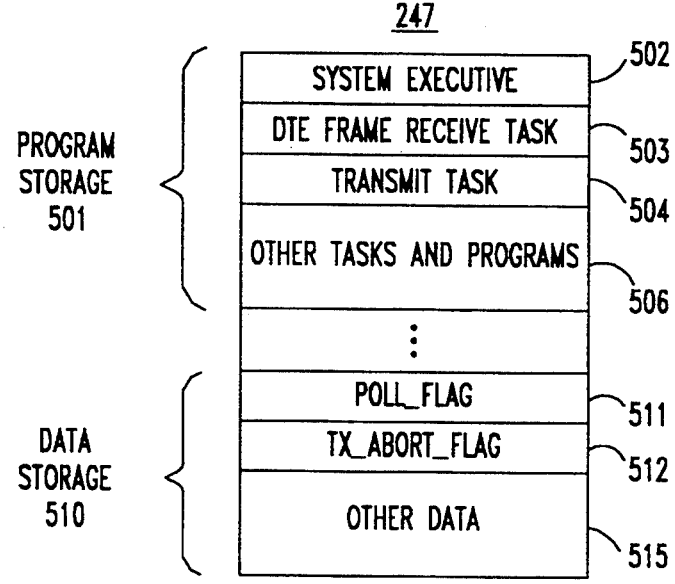
FIG. 5 is a map of the control processor memory within the modem of FIG. 2.

FIG. 5 is a memory map showing the contents of control processor memory 247. The memory has at least two storage areas—program storage area 501 and data storage area 510. Programs stored in area 501 include conventional, system executive software 502. Also included are DTE frame receive task 503 and transmit task 504, which respectively carry out the loading of data into, and the reading of data out of, transmit buffer 261. The operation of tasks 503 and 504 is discussed hereinbelow. Other conventional tasks and programs stored in area 501 are indicated at 506.

Data storage area 510 includes storage locations 511 and 512 in which are stored variables referred to as "POLLFLAG" and "TXABORTFLAG" used by tasks 503 and 504. Other data is stored in memory 247 at locations denoted 515.

Figure 6:
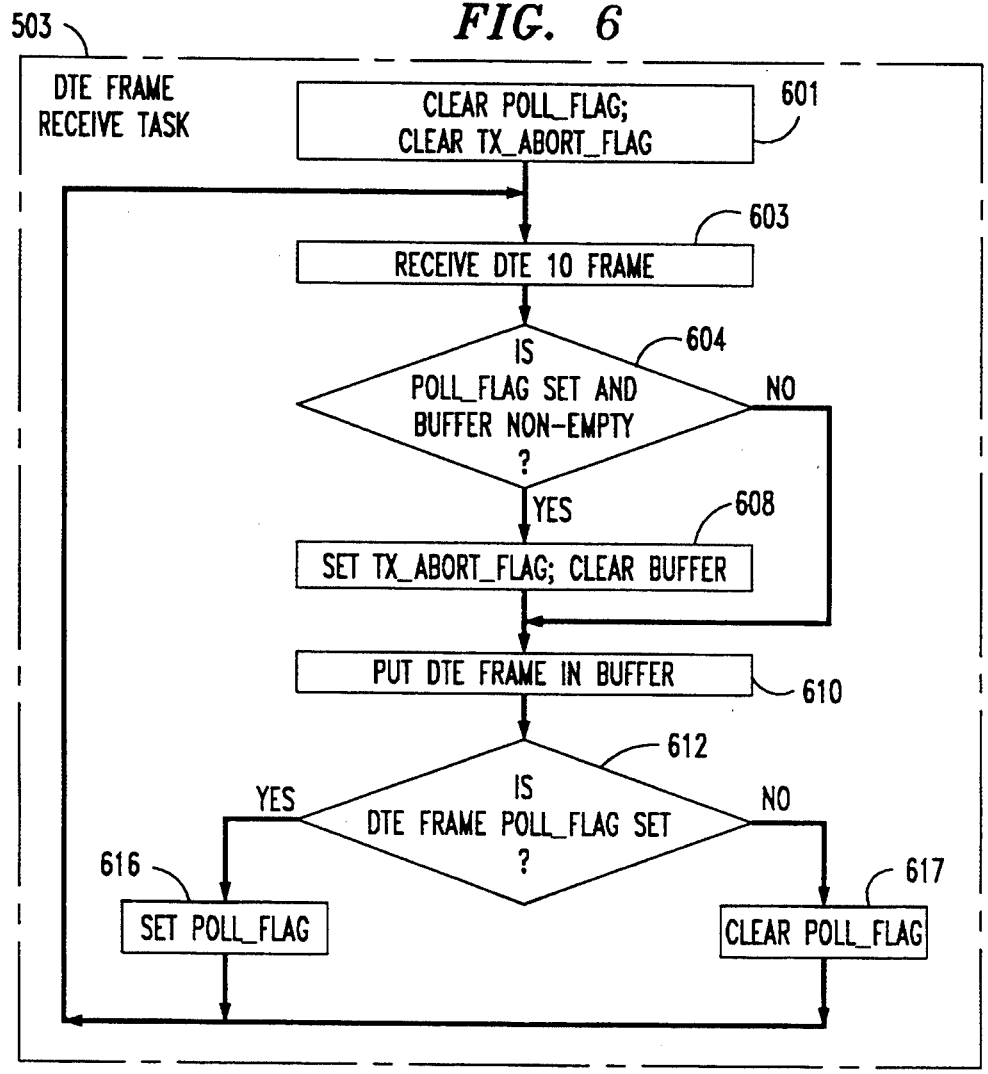
FIGS. 6 and 7 are flowcharts of tasks that execute within the modem of FIG. 2 in carrying out the invention.

FIG. 6 shows the flow of operations of receive task 503, which is periodically invoked by control processor 250. The two aforementioned flags are cleared at 601. Then, after an HDLC frame is received from DTE 10, as indicated at 603, it is determined at 604 whether a) POLLFLAG is set and b) buffer 261 is non-empty. Assuming this is the first pass through task 503, POLLFLAG will not be set and so the frame just received is put into buffer 261, as indicated at 610. The poll flag value that is in the frame itself is then copied into the variable POLLFLAG as indicated at 612, 616 and 617. The task then proceeds back to 603 to receive the next frame, and continues to operate in this manner until it is found at 604 that POLLFLAG was previously set (at 616) and that the buffer is not empty. As will be appreciated from the discussion hereinabove, the coincidence of these two conditions means that there is currently data in buffer 261 that is not intended for DTE 35-N. Accordingly, at 608, the variable TXABORTFLAG (used by task 504 to abort any ongoing transmission, as described below) is set and buffer 261 is cleared. Task 503 then proceeds at 610 to store, in the buffer, the frame just received and the process continues. (If the buffer was found to be empty at 604, there is, of course, no need to clear it or to perform a transmission abort and therefore step 608 is skipped in this case.)

Figure 7:
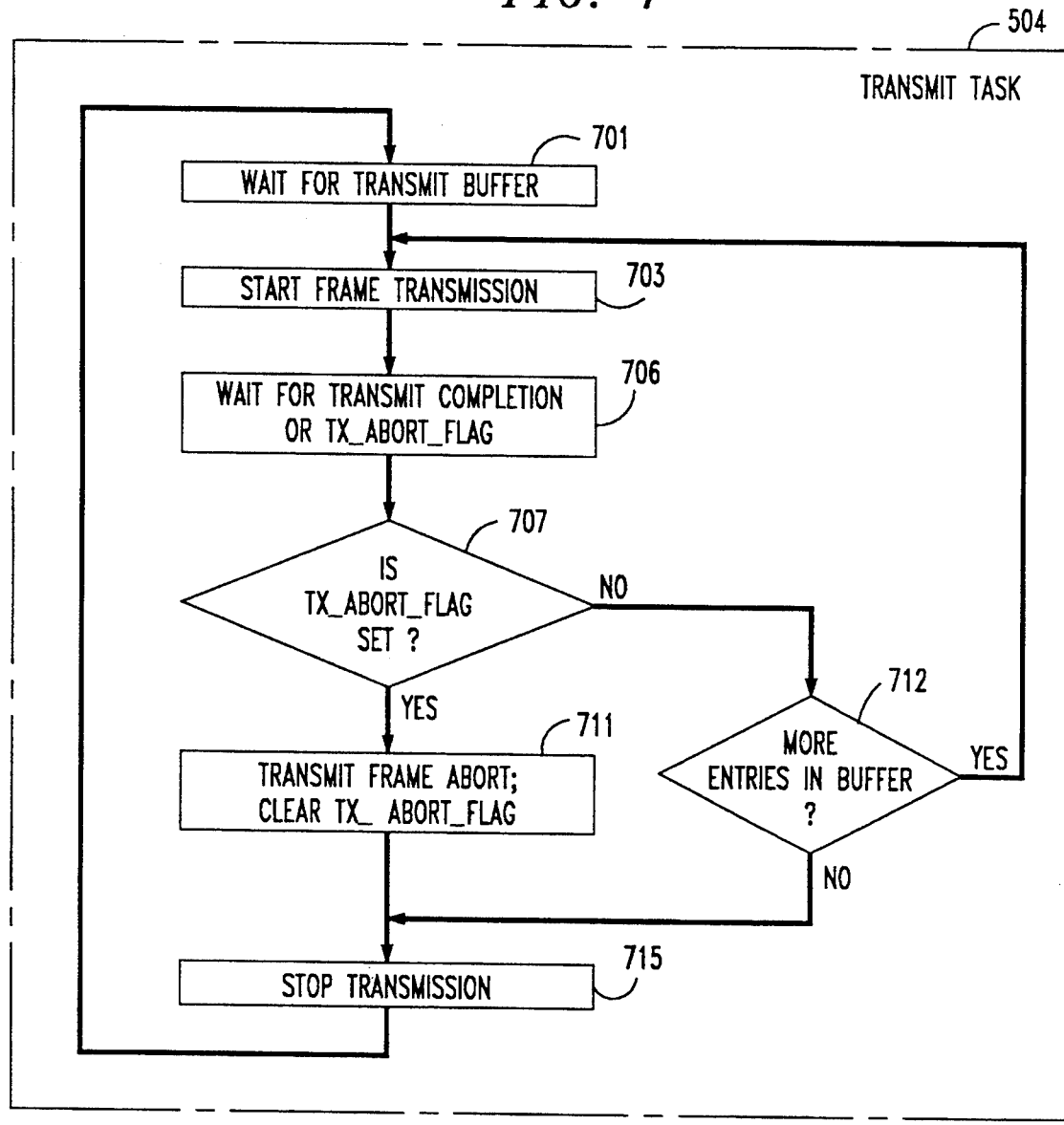

FIG. 7 shows the flow of operations of transmit task 504, which is also periodically invoked by control processor 250. The task waits at 701 until there is data in the buffer to send, in which case transmission begins at 703. The task then waits for one of two events to occur—the completion of the transmission of a frame or the setting of TXABORTFLAG by task 503. Upon leaving the wait state, the task then determines at 707 whether that leaving was, in fact, caused by TXABORTFLAG having been set by task 503. If it was, then transmission of the contents of the buffer to DTE 35-N can be stopped, as indicated at 715, after first sending a special "frame abort" sequence required to be set by HDLC, as indicated at 711. TX ABORT FLAG is also now cleared.

If it is determined at 707 that the TXABORTFLAG was not set, this means that the task left its wait state because the transmission of a frame was completed. If, as determined at 712, there are more frames waiting in the buffer, transmission thereof is initiated at 703. Otherwise, transmission activity is halted at 715 and the task enters a wait state, waiting for the next frame to be received.

The foregoing merely illustrates the principles of the present invention. For example, the HDLC poll bit is illustratively used as the mechanism to identify the frame whose receipt by a tributary DTE means that a response is required. However, other embodiments of the invention may not require this. For example, particular arrangements may limit data transmission from the control site DTE to a single frame, in which case the fact of the receipt of any frame by the dial restoral modem can be used as the mechanism for indicating that the buffer can be cleared of any priorly stored frames. That is, every frame is, for the purposes of the invention, a "poll" frame, whether or not it actually included a set poll bit.

In other embodiments of the invention, the dial restoral modem could be provided with enough further information about the HDLC format to be able to identify the addresses of HDLC frames, and it could be provided with the capability of maintaining a "no-hit" list consisting of the addresses contained in frames that are stored in buffer 261 just before the buffer is cleared. Such addresses, of course, are guaranteed to be other the the address of DTE 35-N. Whenever a frame containing an address on the "no-hit" list is received, it can be immediately discarded without being placed in the buffer at all. This can improve the throughput to DTE-N, especially if the system is taking advantage of the feature of HDLC wherein non-poll frames intended for different destinations can be interleaved with one another. (Such an arrangement would also have to be able to recognize HDLC broadcast addresses, which should not be put on the "no-hit" list.)

The invention can, of course, be used in systems using other than the HDLC protocol. Indeed, a dial restoral modem embodying the principles of the invention could be provided with "strapable" options, which could be selected as a function of which protocol was being used in the network.

Although the invention is illustrated herein in the context of a system in which the multidrop facility is digital, the facility could be analog. Similarly, although dial restoral is currently conventionally carried out using analog modems, the invention could be used with other dial back-up technologies that currently exist or that may be devised in the future.

It will thus be appreciated that those skilled in the art will be able to devise numerous alternative arrangements which, although not shown or described herein, embody the principles of the invention and are within their spirit and scope.

We claim:

1. A dial restoral modem comprising
means for receiving, at a first data rate, a succession of frames formatted in accordance with a predetermined data communication protocol,
means for storing the received frames in a buffer and for thereafter transmitting the contents of said buffer over a dial-up telephone connection at a second data rate that is lower than the first data rate, and
means responsive to each received frame that has a poll indication in a set state for clearing said buffer upon the receipt of a subsequent one of said frames.

2. The invention of claim 1 wherein said protocol is a bit-synchronous protocol.

3. A modem for use in a system of the type which comprises control site DTE, data terminal equipment and a plurality of tributary site DTEs data terminal equipments, said control site DTE communicating information frames to said tributary site DTEs over a communications facility at a first data transmission rate using a predetermined protocol, said modem being adapted to establish a connection, separate from said facility, between said control site DTE and a particular one of said tributary DTEs at a second data transmission rate which is lower than said first data transmission rate, each of said frames including address information identifying a respective tributary site DTE intended for said each frame, said modem comprising
means for receiving the same frames that are communicated by said control site DTE over said facility,
means for storing the received frames in a buffer and for thereafter transmitting the contents of said buffer over said connection at said second data transmission rate, and
means for repetitively determining, independent of the address information in said received frames, whether the present contents of said buffer are intended only for tributary DTEs other than said particular one and, if so, for clearing said buffer.

4. The invention of claim 3 wherein each of said frames further includes control information for regulating the flow of the information frames among said control site and tributary site DTEs and wherein said determining means carries out said determining as a function of the control information of said received frames.

5. The invention of claim 4 wherein said frames are formatted in accordance with a bit-synchronous protocol and wherein said control information includes a poll bit.

6. The invention of claim 5 wherein said protocol is HDLC.

7. A modem for use in a system of the type which comprises control site DTE, data terminal equipment and a plurality of tributary site DTEs, data terminal equipments which communicate over a communications facility at a first data transmission rate using a predetermined protocol, said modem being adapted to establish a connection, separate from said facility, between said control site DTE and a particular one of said tributary DTEs at a second data transmission rate which is lower than said first data transmission rate, said protocol including the transmission of data in frames and said protocol being such that, upon the transmission of a frame by said control site DTE to a particular tributary DTE from which a response is expected, referred to as a "poll frame," said control site DTE will not transmit further frames until it has received said response, said modem comprising
means for receiving the same frames that are communicated by said control site DTE over said facility,
means for storing the received frames in a buffer and for thereafter transmitting the contents of said buffer over said dial-up connection at said second data transmission rate, and
means for detecting the occurrence of each said poll frame among said received frames and, in response to said detecting, for clearing said buffer upon the receipt of a subsequent one of said frames.

8. The invention of claim 7 wherein said connection is a dial-up connection over a public switched telephone network.

9. The invention of claim 8 wherein said facility is a multidrop network.

10. The invention of claim 7 wherein each of said frames includes a predetermined signal which is set only in said poll frames and wherein said means for detecting detects the occurrence of each said poll frame by detecting the set state of the predetermined signal thereof.

11. The invention of claim 10 wherein said connection is a dial-up connection over a public switched telephone network.

12. The invention of claim 11 wherein said protocol is the HDLC protocol.

13. Data communications apparatus for providing communications between control site DTE, data terminal equipment and a plurality of tributary site DTEs, data terminal equipments over a communications facility at a first data transmission rate using a predetermined protocol, said protocol including the transmission of data in frames and said protocol being such that, upon the transmission of a frame by said control site DTE to a particular tributary DTE from which a response is expected, referred to as a "poll frame," said control site DTE will not transmit further frames until it has received said response, said apparatus comprising
control site data communications equipment for receiving said frames from said control site DTE and for applying them to said facility,
means including at least a first modem for establishing a connection, separate from said facility, between said control site DTE and a particular one of said tributary DTEs, said modem communicating over said connection at a second data transmission rate that is lower than said first data transmission rate, and means for additionally applying said received frames to said modem, said modem comprising means for receiving the same frames that are communicated by said control site DTE over said facility, means for storing the received frames in a buffer and for thereafter transmitting the contents of said buffer over said connection at said second data transmission rate, and means for detecting the occurrence of each said poll frame among said received frames and, in response to said detecting, for clearing said buffer upon the receipt of a subsequent one of said frames.

14. The invention of claim 13 wherein each of said frames includes a predetermined signal which is set only in said poll frames and wherein said means for detecting detects the occurrence of each said poll frame by detecting the set state of the predetermined signal thereof.

15. The invention of claim 14 wherein said protocol is a bit-synchronous protocol.

16. The invention of claim 13 wherein said facility is a multidrop network.

17. A communications system including control site DTE, data terminal equipment and a plurality of tributary site DTEs, data terminal equipments, said control site and tributary site DTEs being adapted to communicate information frames over a communications facility at a first data transmission rate using a predetermined protocol, each of the frames communicated by said control site DTE including address information identifying a respective tributary site DTE for which said each frame is intended, and a dial restoral modem adapted to establish a connection, separate from said facility, between said control site DTE and a particular one of said tributary DTEs at a second data transmission rate which is lower than said first data transmission rate, said dial restoral modem comprising means for receiving the same frames that are communicated by said control site DTE over said facility, means for storing the received frames in a buffer and for thereafter transmitting the contents of said buffer over said connection at said second data transmission rate, and means for repetitively determining, independent of the address information in said received frames, whether the present contents of said buffer are intended only for tributary DTEs other than said particular one and, if so, for clearing said buffer.

18. The invention of claim 17 wherein each of said frames further includes control information for regulating the flow of the information frames among said control site and tributary site DTEs and wherein said determining means carries out said determining as a function of the control information of said received frames.

19. The invention of claim 18 wherein said frames are formatted in accordance with a bit-synchronous protocol and wherein said control information includes a poll bit.

20. The invention of claim 19 wherein said protocol is HDLC.

21. A method for use in a modem included within a system of the type which comprises control site DTE, data terminal equipment and a plurality of tributary site DTEs, data terminal equipments, said control site DTE communicating information frames to said tributary site DTEs over a communications facility at a first data transmission rate using a predetermined protocol, said modem being adapted to establish a connection, separate from said facility, between said control site DTE and a particular one of said tributary DTEs at a second data transmission rate which is lower than said first data transmission rate, each of said frames including address information identifying a respective tributary site DTE intended for said each frame, said method comprising the steps of receiving the same frames that are communicated by said control site DTE over said facility, storing the received frames in a buffer and thereafter transmitting the contents of said buffer over said connection at said second data transmission rate, and repetitively determining, independent of the address information in said received frames, whether the present contents of said buffer are intended only for tributary DTEs other than said particular one and, if so, clearing said buffer.

22. The invention of claim 21 wherein each of said frames further includes control information for regulating the flow of the information frames among said control site and tributary site DTEs and wherein in said determining step, said determining is carried out as a function of the control information of said received frames.

23. The invention of claim 22 wherein said frames are formatted in accordance with a bit-synchronous protocol and wherein said control information includes a poll bit.

24. The invention of claim 23 wherein said protocol is HDLC.

25. A method for use in a dial restoral modem included within a data communications system of the type which comprises control site DTE, data terminal equipment and a plurality of tributary site (DTEs), data terminal equipments which communicate over a communications facility at a first data transmission rate using a predetermined protocol, said protocol including the transmission of data in predetermined frames and said protocol being such that, upon the transmission of a frame by said control site DTE to a particular tributary DTE from which a response is expected, referred to as a "poll frame," said control site DTE will not transmit further frames until it has received said response, said method comprising the steps of establishing a connection with a particular one of said tributary DTEs at a second data transmission rate which is lower that said first data transmission rate, said connection being separate from said facility, receiving the same frames that are communicated by said control site DTE over said facility, storing the received frames in a buffer and thereafter transmitting the contents of said buffer over said dial-up connection at said second data transmission rate, and detecting the occurrence of each said poll frame among said received frames and, in response to said detecting, clearing said buffer upon the receipt of a subsequent one of said frames.

26. The invention of claim 25 wherein said connection establishing step comprises the step of establishing a dial-up connection over a public switched telephone network.

27. The invention of claim 26 wherein said protocol is a bit-synchronous protocol.

28. The invention of claim 25 wherein each of said frames includes a predetermined signal which is set only in said poll frames and wherein in said detecting step, the occurrence of each said poll frame is detected by detecting the set state of the predetermined signal thereof.

29. The invention of claim 25 wherein said connection establishing step comprises the step of establishing a dial-up connection over a public switched telephone network.

* * * * *